United States Patent
Robinson et al.

(10) Patent No.: US 12,132,611 B1
(45) Date of Patent: Oct. 29, 2024

(54) SYSTEMS AND METHODS FOR AUTOMATICALLY CONFIGURING COMPUTER DEVICES

(71) Applicant: Amazon Technologies, Inc., Seattle, WA (US)

(72) Inventors: Quentin N Robinson, Springfield, NJ (US); Mark Gilbert, Issaquah, WA (US); Joseph Kramer, Denver, CO (US); Zachary Douglas Bears, Alexandria, VA (US); Gregory Christopher John Vandenbrouck, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/955,915

(22) Filed: Sep. 29, 2022

(51) Int. Cl.
*H04L 41/0823* (2022.01)
*H04L 9/32* (2006.01)

(52) U.S. Cl.
CPC ........ *H04L 41/0823* (2013.01); *H04L 9/3226* (2013.01); *H04L 2209/80* (2013.01)

(58) Field of Classification Search
None
See application file for complete search history.

(56) References Cited

U.S. PATENT DOCUMENTS

| | | | |
|---|---|---|---|
| 11,831,779 B2* | 11/2023 | Yadav | G06F 16/2365 |
| 2020/0366669 A1* | 11/2020 | Gupta | G06K 19/06037 |
| 2022/0210642 A1* | 6/2022 | Slovetskiy | H04W 12/068 |
| 2022/0261817 A1* | 8/2022 | Ferrucci | G06N 20/00 |
| 2023/0101347 A1* | 3/2023 | Byington | G06F 21/36 |
| | | | 726/17 |

* cited by examiner

*Primary Examiner* — Oleg Survillo
*Assistant Examiner* — Christopher P Cadorna
(74) *Attorney, Agent, or Firm* — Kilpatrick Townsend & Stockton LLP

(57) ABSTRACT

Systems and methods described herein provide for novel configuration features for setting up a user device automatically to connect to a network and register the user device to a user account. A mapping of user devices to cryptographic keys for the user devices may be maintained by a computer system. The computer system may receive information that specifies network information and user account information for a particular user device. A mapping of the network information and user account information to the particular user device may be generated. A machine-readable code that includes the network information for connecting the particular user device to the network and a token that includes credentials for the user account information may be generated and transmitted to a assistant configuration device.

20 Claims, 14 Drawing Sheets

≡All Supporting: ABCDE... ▼ Basics Browsing History▼ Outlet Buy Again Registry Smart Home Baby Toys & Games Coupons Deliver to Jane Anytown 99999 | All ▼ | [search] 🔍 | Hello, Jane ▼ Accounts & Lists Returns & Orders 🛒Cart

*202*

*200*

Device 5 (2nd Gen) — *204*

To make the setup experience as simple as possible, take a moment to fill out some settings below.

Account Info — To Do ∨ — *206*

This device is for
◉ Me
○ Someone Else
Your information
<Name>
name******@gmail.com
[Next]

*208* — To move between sections, customer must click on "Next" to register the step as done

| Wifi Information | To Do ∨ |
| Customize Device | To Do ∨ |
| Communications | To Do ∨ |
| Accessibility | To Do ∨ |

SYSTEMS AND METHODS FOR AUTOMATICALLY CONFIGURING COMPUTER DEVICES

BACKGROUND

Different devices are available for presenting content to users or for providing other benefits to users. However, configuring devices to connect to a local network, apply accessibility settings which are particular to a user, and download and install various applications for a newly received device can be daunting for some users. This can result in devices which are not properly configured and utilized or devices which are provided as gifts and never utilized.

BRIEF DESCRIPTION OF THE DRAWINGS

Various embodiments in accordance with the present disclosure will be described with reference to the drawings, in which:

FIG. 2 illustrates an example user interface for specifying information for configuring a user device and implementing a configuration feature, according to at least one embodiment;

FIG. 5 illustrates an example user interface for specifying information for configuring a user device and implementing a configuration feature, according to at least one embodiment;

DETAILED DESCRIPTION

Figure 1:
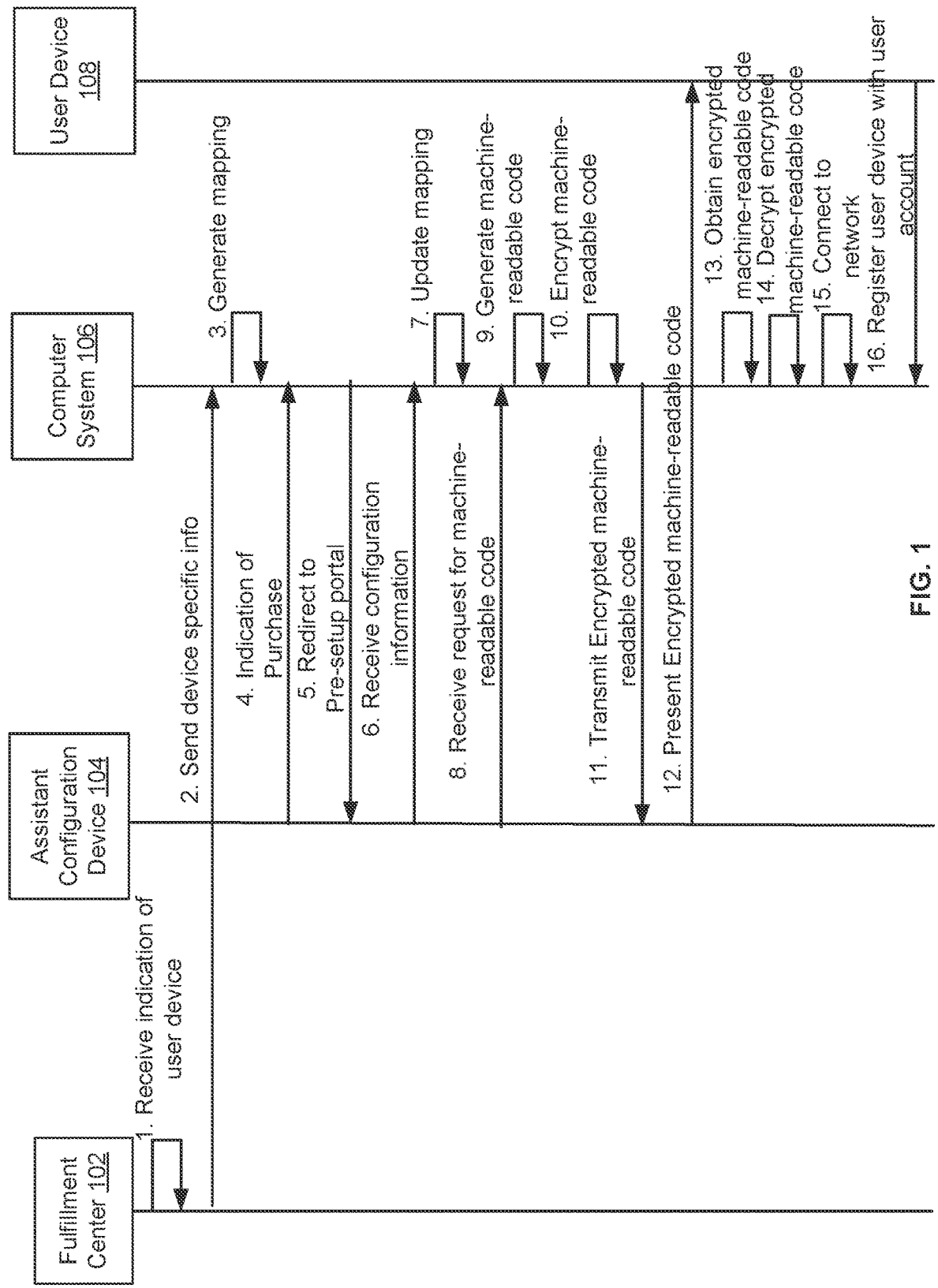
FIG. 1 illustrates an example of a sequence diagram between a fulfillment center, an assistant configuration device, computer system, and user device to implement a configuration feature for a user device, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, implementing configuration features for automatically and/or semi-automatically configuring user devices to connect to a network, such as the internet, and register the user device with a user account. Users can interact with a portal (user interface, web page, application etc.,) upon purchasing a user device from an online merchant to provide network information and user account information for the recently purchased user device. The configuration features described herein enable users to not only pre-setup or pre-configure a user device for themselves but also for another user. Users who have a user device purchased by another user, such as in the case of gifting a user device, will receive a confirmation message enabling them to opt-in to the configuration features described herein. A computer system (server) implementing the configuration features described herein may maintain a mapping of cryptographic keys for manufactured user devices which are identified by a device identifier of the user devices. In embodiments the cryptographic keys may be associated with a type of the user device and/or generated using device specific information of the user devices. The mapping to the device identifier may be updated to associate information provided by users via the portal (pre-setup portal) such that the user device may be associated with information specific to a user and enable the user to configure the user device upon delivery.

In embodiments, users can provide network information such as a service set identifier (SSID) for a network associated with them as well as a password for connecting to the network. Users may also provide user account information to register the user device with an account maintained by the computer system or other service, such as a service associated with an online merchant or content provider. The pre-setup portal may present a varied number and type of configuration settings or accessibility settings based on a type of the user device. Users may interact with the pre-setup portal to provide preferences for the user device, specify the configuration settings for the user device, or accessibility settings for the user device. Once the user has provided the information for the user device to be configured for themselves or on behalf of another user, or provided just the configuration settings, accessibility settings, and network information, the computer system may update the mapping (e.g., update database entries) to associate the provided information with the device identifier that corresponds to the purchased user device.

In embodiments, once the user device is delivered to the user or the gift recipient (other user) the computer system may receive a request or other indication for a machine-readable code, such as a quick response (QR) code, that includes information for configuring the user device. The computer system implementing the configuration features described herein can generate the machine-readable code which includes the network information and a token that further includes the user account information. The machine-readable code and/or the token may then be encrypted using the cryptographic keys associated with the user device. In embodiments, the token may be a time limited token that expires upon expiration of a certain time period such as ten or twenty days. The machine-readable code may be transmitted to an assistant configuration device associated with the user. In embodiments, an assistant configuration device may be a mobile device, a table computer, a video game device, or other user device that is associated with the user. The assistant configuration device may already be connected to the network associated with the user. The assistant configuration device may be configured to receive a machine-readable code and present the machine-readable code to the user device to configure the user device. The user device (e.g., the computer device being configured via the configuration features described herein) may include a camera or other sensors such as a microphone for interacting with the machine-readable code presented by the assistant configuration device.

In accordance with at least one embodiment, the user device may be configured to utilize a locally stored cryptographic key that corresponds to the cryptographic key maintained by the computer system and decrypt the encrypted machine-readable code and/or token. The user device may be configured to extract the network information from the machine-readable code and connect to the corresponding network associated with the user using the extracted network information. Similarly, the user device can use the user account information to connect to a service, via the network, and register the user device to a user account that corresponds to the user account information. Once connected to the network the user device can implement a number of applications or make one or more application programming interface (API) calls to obtain the configuration and accessibility settings for the user device and adjust those settings for the user device. For example, the applications or API calls may connect to a service via the network and identify the appropriate configuration and accessibility settings based on the user account registered to the user device that were previously provided in response to the user interacting with the pre-setup portal.

To illustrate, consider an example of a first user wishing to purchase a streaming computer device (user device) for a second user such as a family member. The second user may not remember their network information or have trouble remembering their network information. The first user can use the pre-setup portal, after purchasing the streaming computer device, to provide network information and configuration and/or accessibility settings for the streaming computer device. Thereafter, the second user would be notified by the computer system and/or service that they are receiving a gift and that it is being pre-configured by the first user. Once the second user accepts such a gift and designation of information on their behalf, the computer system may update the mapping of provided information to the device identifier for the streaming computer device. Upon the streaming computer device being delivered to the second user, the second user may use an assistant configuration device, such as their mobile phone, to request or receive a machine-readable code. The second user may receive the machine-readable code, which includes the network information and user account information, and present the machine-readable code to the streaming computer device. The streaming computer device can interact with the machine-readable code and connect to a local network using the network information contained therein. Once connected to the local network the streaming computer device can connect to a service implemented by a computer system to obtain configuration and/or accessibility settings for the streaming computer device. The streaming computer device can automatically adjust the configuration and/or accessibility settings for itself and thereafter the second user can enjoy using the streaming computer device without having to manually setup the streaming computer device.

Embodiments of the present disclosure provide several technical advantages over conventional manual processes for setting up and/or configuring user devices. For instance, conventional manual processes, even if guided, can lead to frustration as users are unable to remember certain information or credentials which are required to setup the user device. User devices may include small screens which are hard to view for people with vision impairments or touch keyboards which are difficult for people with fine motor skill disabilities. The configuration features described herein can solve these issues by presenting the machine-readable code to the user device which enables the user device to auto-configure itself. Moreover, security benefits can be achieved as if the user device is intercepted during delivery the information provided by the user or on behalf of another user would still be unavailable to the malicious actor. Therefore, user provided information is protected and secure. The use of the encrypted information ensures that only the correct recipients can have access to and utilize the machine-readable code to automatically or semi-automatically configure the user device.

FIG. 1 illustrates an example of a sequence diagram between a fulfillment center 102, assistant configuration device 104, computer system 106, and user device 108 to implement a configuration feature for a user device, according to at least one embodiment. In embodiments, the fulfillment center 102 may represent a computer system or server associated with a facility that manufacturers or stores manufactured user devices. The fulfillment center 102 may be configured to receive instructions to ship and deliver a particular user device to a user upon receiving a purchase order for the particular user device. The assistant configuration device 104 may be a user device that is associated with a user already and separate from the user device 108. In FIG. 1 the user device 108 represents a user device that is purchased and needs to be configured for a user or on behalf of another user. Examples of the assistant configuration device 104 may include a mobile phone, a tablet computer, an Internet of Things (IoT) device, a laptop computer, a desktop computer, a digital gaming device, etc. The assistant configuration device 104 may include a user interface or display screen for presenting machine-readable codes received from the computer system 106. In embodiments, the fulfillment center 102 may be in communication with the assistant configuration device 104 and computer system 106 via available networks such as the Internet. The computer system 106 and assistant configuration device 104 may be in communication with each other via available networks such as the Internet. Although FIG. 1 depicts processes or steps for implementing a configuration feature which includes a purchase, delivery, and configuration of a single user device (user device 108), embodiments disclosed herein are not limited to configuring only a single user device. Users may purchase and provide information or multiple user devices which may have their configuration information included in a single machine-readable code or multiple machine-readable codes.

In embodiments, the computer system 106 may include one or more computers or servers associated with an online merchant that offers user devices and is in communication with fulfillment center 102. The computer system 106 may be configured to utilize one or more algorithms, modules, and/or databases for maintaining a mapping of user devices to information associated with a user as well as information used to encrypt information associated with each user device such cryptographic keys. The computer system 106 may be configured to generate and provide various interfaces and portals such as the purchase portal and pre-setup portal which users can interact with to purchase user devices and provide information required to configure the user devices. The user device 108 may be an example of the user devices manufactured or otherwise stored at fulfillment center 102 and available for purchase by users. Examples of the user device 108 can include mobile phones, Internet of Things (IoT) devices, voice activated devices, streaming content devices, tablet computers, laptop computers, etc. The user device 108 may include one or more cameras, image capturing sensors, microphones, or sensors for interacting with machine-readable codes presented by user device 104.

FIG. 1 includes a number of steps or processes for providing the configuration features described herein. It should be noted that although a certain order of the steps is presented in FIG. 1 this does not denote the only order for the steps to be performed for implementing the configuration features. For example, the computer system 106 may receive an order for a user device 108 prior to the user device 108 being manufactured. Moreover, machine-readable codes may be provided to assistant configuration device 104 upon receiving a request for the machine-readable code or upon expiration of a certain time period from ordering the user device 108. As illustrated, in a first step of the sequence diagram of FIG. 1, the fulfillment center 102 may receive an indication of a recently manufactured or recently received user device 108 and obtain device specific information for the user device 108.

As illustrated, in a second step of the sequence diagram of FIG. 1, the fulfillment center 102 provides the device specific information to the computer system 106.

As illustrated, in a third step of the sequence diagram of FIG. 1, the computer system 106 generates an entry in a maintained mapping for the user device 108. The maintained mapping may include a generated cryptographic key for the user device 108 that is encrypted using the device specific information of the user device 108 or other information. The encryption, decryption, and generation and maintaining of cryptographic keys described herein may include a symmetric cryptography technique.

As illustrated, in a fourth step of the sequence diagram of FIG. 1, the computer system 106 receives an indication of a purchase of user device 108 via a purchase portal presented by assistant configuration device 104 and provided by computer system 106. As described herein and below the purchase of the user device 108 can be for a user themselves or on behalf of another user.

As illustrated, in a fifth step of the sequence diagram of FIG. 1, the computer system 106 redirects the assistant configuration device 104 from the purchase portal to a pre-setup portal that is provided by the computer system 106. Although FIG. 1 depicts the computer system 106 redirecting the assistant configuration device 104 from a purchase portal to a pre-setup portal, embodiments described herein are not limited to such use cases. For example, a user may utilize a number of different computer devices which have access to the Internet to interact with the online merchant, the purchase portal, and the pre-setup portal. In embodiments, the pre-setup portal enables a user to interact, via the assistant configuration device 104, with the pre-setup portal and provide information for configuring the user device 108 such as network information, user account information, and configuration and/or accessibility settings for the user device 108.

As illustrated, in a sixth step of the sequence diagram of FIG. 1, the computer system 106 receives, from the assistant configuration device 104 and via the pre-setup portal, the network information, user account information, and configuration and/or accessibility settings (configuration information) for configuring the user device 108.

As illustrated, in a seventh step of the sequence diagram of FIG. 1, the computer system 106 updates the mapping for the user device 108 to associate the configuration information with the entry for the user device 108. In embodiments, the configuration information may be associated with the correct user device of a plurality of user device entries maintained by the computer system 106 using a device identifier associated with user device 108.

As illustrated, in an eight step of the sequence diagram of FIG. 1, the computer system 106 receives, from assistant configuration device 104, a request for a machine-readable code for configuring the user device 108. In embodiments, the request for the machine-readable code can be provided by a user associated with the assistant configuration device 104 upon the user receiving the user device 108. In some embodiments, the computer system 106 may provide the machine-readable code to the assistant configuration device 104 upon receiving an indication from fulfillment center 102 that the user device 108 is being delivered (e.g., en route), or an indication that the user device 108 has been delivered to the user. In some embodiments, the computer system 106 may receive an indication such as a scanning of a tracking tag upon delivery to the address associated with the user to generate the machine-readable code.

As illustrated, in a ninth step of the sequence diagram of FIG. 1, the computer system 106 generates the machine-readable code that includes the network information and a token that further includes the user account information for the user associated with assistant configuration device 104. In embodiments, the token may be a time limited token which is only accepted by computer system 106 during a certain time period associated with the token. The token may include a credential(s) that represent the user account information for an account of the user that is associated with the service.

As illustrated, in a tenth step of the sequence diagram of FIG. 1, the computer system 106 encrypts the machine-readable code using the cryptographic key for the user device 108. In embodiments, the computer system 106 identifies the cryptographic key for the user device 108 by using the device identifier associated with the user device 108 to look up the correct information in the maintained mapping of cryptographic keys to user devices. In accordance with at least one embodiment, the computer system 106 encrypts only the token or both the machine-readable code and the token.

As illustrated, in an eleventh step of the sequence diagram of FIG. 1, the computer system 106 transmits the encrypted machine-readable code to the assistant configuration device 104. In embodiments, the computer system 106 may transmit the encrypted machine-readable code to the assistant configuration device 104 via a number of communication channels such as a short message service (SMS) text, an email, or an application notification or update for an application of assistant configuration device 104. In some embodiments the machine-readable code may printed and mailed to the user for configurating the user device 108.

As illustrated, in a twelfth step of the sequence diagram of FIG. 1, the assistant configuration device 104 presents the encrypted machine-readable code to the user device 108. In embodiments, the assistant configuration device 104 may present the encrypted machine-readable code to the user device 108 using an associated display, user interface, or other output components such as audio components depending on a type of the machine-readable code. For example, the machine-readable code may include an audio signal that is presented by assistant configuration device 104 via an associated speaker and received by a microphone or other sensor of user device 108.

As illustrated, in a thirteenth step of the sequence diagram of FIG. 1, the user device 108 obtains, using an associated camera or sensor, the encrypted machine-readable code. In embodiments, the user device 108 may use associated cameras or sensors to interact with or otherwise scan the encrypted machine-readable code.

As illustrated, in a fourteenth step of the sequence diagram of FIG. 1, the user device 108 decrypts the encrypted machine-readable code using a locally stored cryptographic key that corresponds to the cryptographic key for the user device 108 maintained by the computer system 106.

As illustrated, in a fifteenth step of the sequence diagram of FIG. 1, the user device 108 connects to a network, a local network for example, using the network information of the decrypted machine-readable code.

As illustrated, in a sixteenth step of the sequence diagram of FIG. 1, the user device 108 connects to the computer system 106 to register the user device 108 with a user account using the user account information (credential) included in the decrypted machine-readable code. In accordance with at least one embodiment, the user device 108 may instead receive the network information and user account information from a nearby device (e.g., within proximity range), referred to herein as a provisioning device, to connect to the network and register the user device 108 with the user account. For example, the user device 108 upon powering on may attempt to connect with a nearby device (provisioning device) that is already connected to the network and configured to support the user device 108 in connecting to the same network. The user device 108 and provisioning device may perform a handshake operation or other verification operation before the provisioning device transmits the appropriate network information to enable the user device 108 to connect to the network.

FIG. 2 illustrates an example user interface 200 for specifying information for configuring a user device and implementing a configuration feature, according to at least one embodiment. The user interface 200 in FIG. 1 is presented via an application 202 but it may be presented via other user platforms such as a web page. The user interface 200 of FIG. 2 presents one or more options and features associated with a pre-setup portal. For example, the user interface 200 includes an identification of the purchased user device 204. The user interface 200 also includes fields or options to determine whether the account information 206 is for themselves or for another person, such as a gift recipient. The pre-setup portal may be generated and supported by the service and computer system implementing the configuration features described herein. In situations where a user has an account associated with the service the account information 206 may be auto-populated by the service. The user interface 200 also includes guide tool tips 208 to aid a user in navigating the pre-setup portal.

Figure 3:
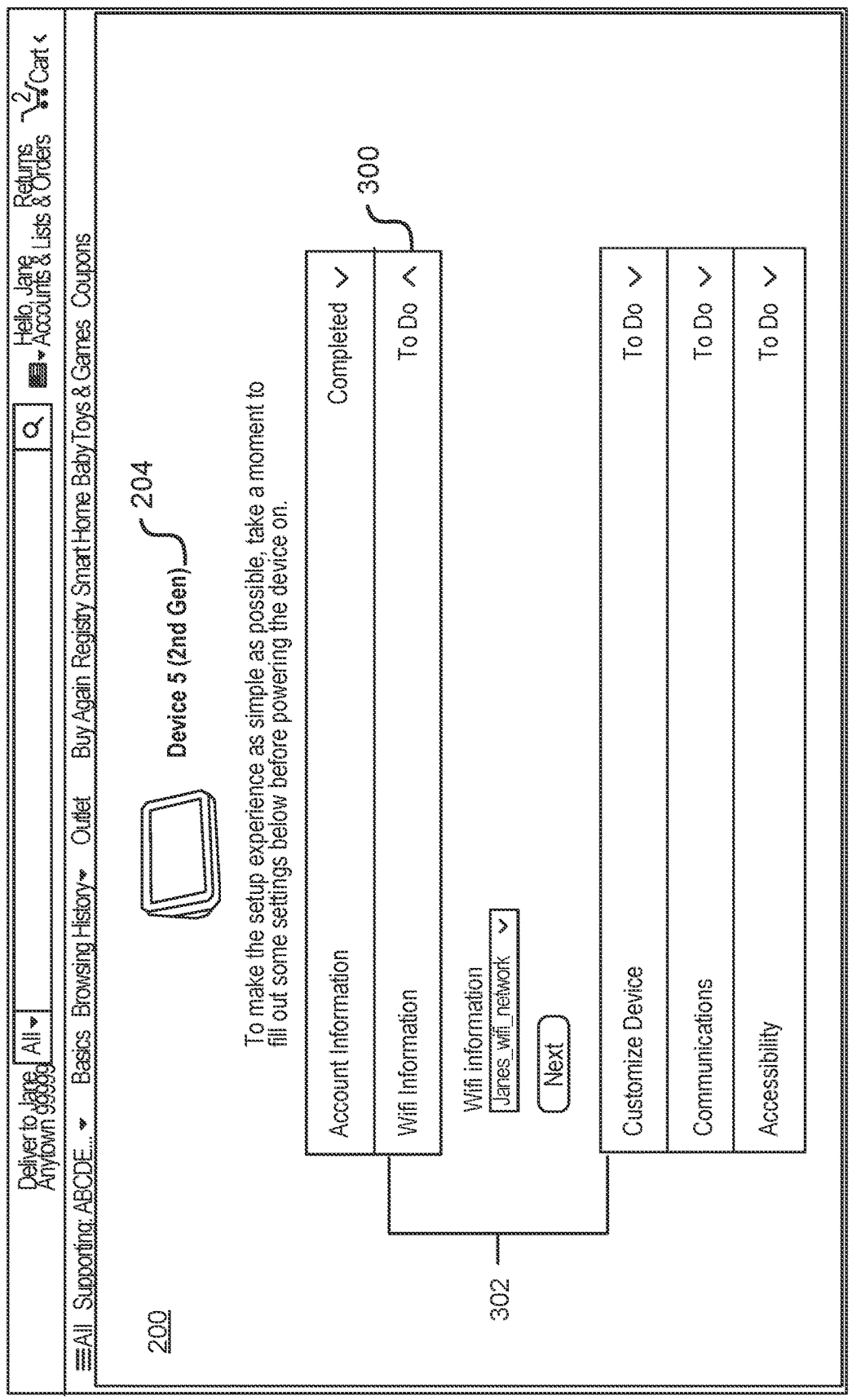
FIG. 3 illustrates an example user interface for specifying information for configuring a user device and implementing a configuration feature, according to at least one embodiment.

FIG. 3 illustrates an example user interface 200 for specifying information for configuring a user device and implementing a configuration feature, according to at least one embodiment. FIG. 3 illustrates an update to the user interface 200 of FIG. 2 and represents a transition from the user providing account information to providing network information 300 for a network that the user device 204 will connect to upon being delivered. As illustrated in FIG. 3, the pre-setup portal can include options to enable a user to provide various information 302 corresponding to network information including an SSID and password as well as other information such as a designation for the user device 204 and which network the computer device 204 will connect to if multiple networks are available. In embodiments, the network information 300 can be pre-populated by the service based on the account information associated with the user purchasing the user device 204. Users can also interact with user interface 200 to add other networks and provide network information for the added networks. In use cases where a user is providing network information 300 on behalf of another user, the network information 300 presented via user interface 200 would not be prepopulated. Instead, the user would have options to manually provide the network information 300.

Figure 4:
FIG. 4 illustrates an example user interface for specifying information for configuring a user device and implementing a configuration feature, according to at least one embodiment.

FIG. 4 illustrates an example user interface 200 for specifying information for configuring a user device and implementing a configuration feature, according to at least one embodiment. FIG. 4 illustrates an update to the user interface 200 of FIG. 3 and represents a transition from the user providing network information to providing configuration settings 400. As illustrated in FIG. 4, the pre-setup portal can include options 402 to enable a user to provide various information which can be used to customize the user device 204 such as a device address, time zone, device name, and device location which may correspond to multiple locations or networks which the user device 204 may be associated with upon delivery. In embodiments, the amount and type of options 402 presented via user interface 200 may be determined by the computer system based on a type of the user device 204.

Figure 5:
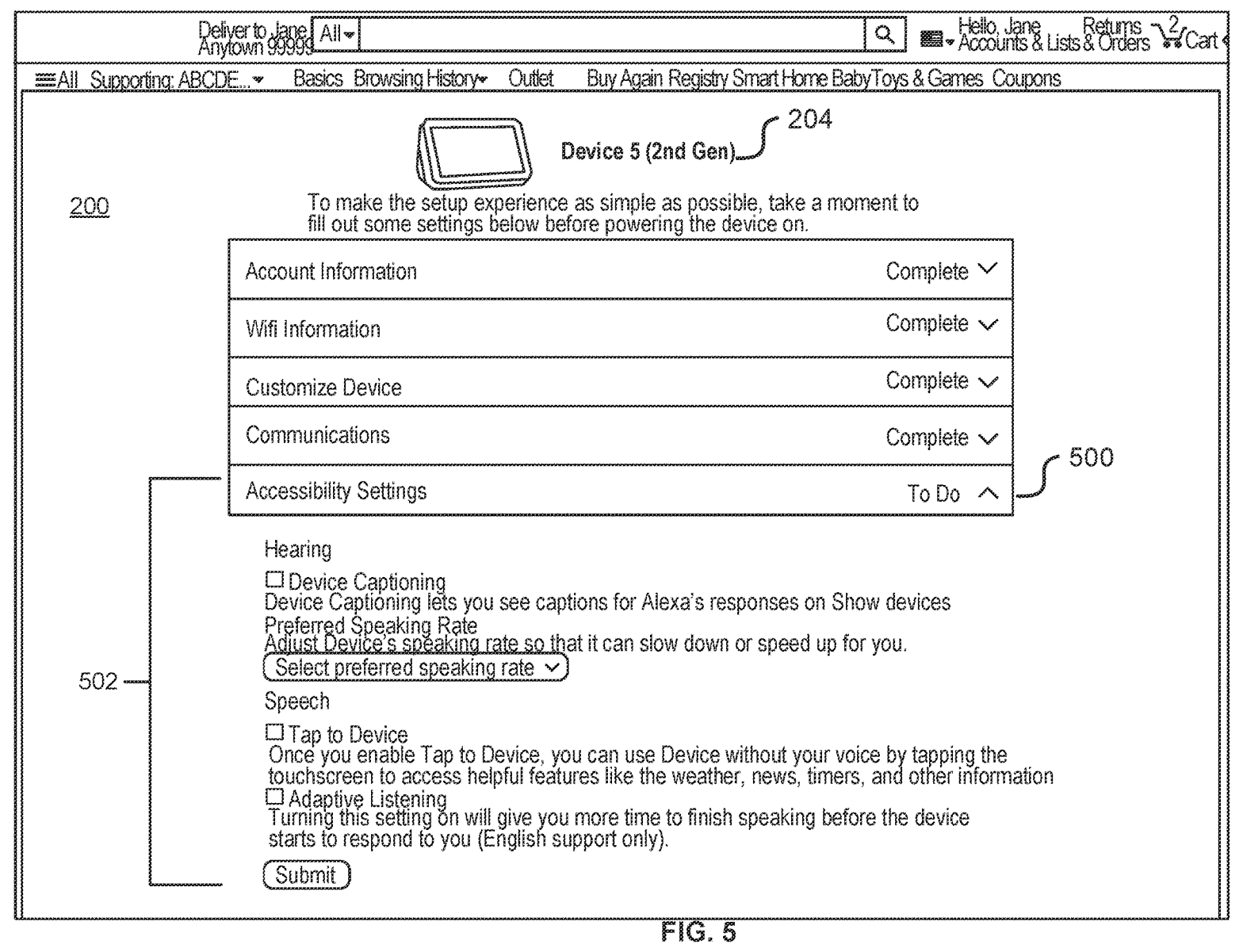

FIG. 5 illustrates an example user interface 200 for specifying information for configuring a user device and implementing a configuration feature, according to at least one embodiment. FIG. 5 illustrates an update to the user interface 200 of FIG. 4 and represents a transition from the user providing configuration settings to providing accessibility settings 500. As illustrated in FIG. 5, the pre-setup portal can include options 502 to enable a user to provide various information which can be used to customize accessibility features of the user device 204 such as device captioning and speech settings. In embodiments, the amount and type of options 502 presented via user interface 200 may be determined by the computer system based on a type of the user device 204.

Figure 6:
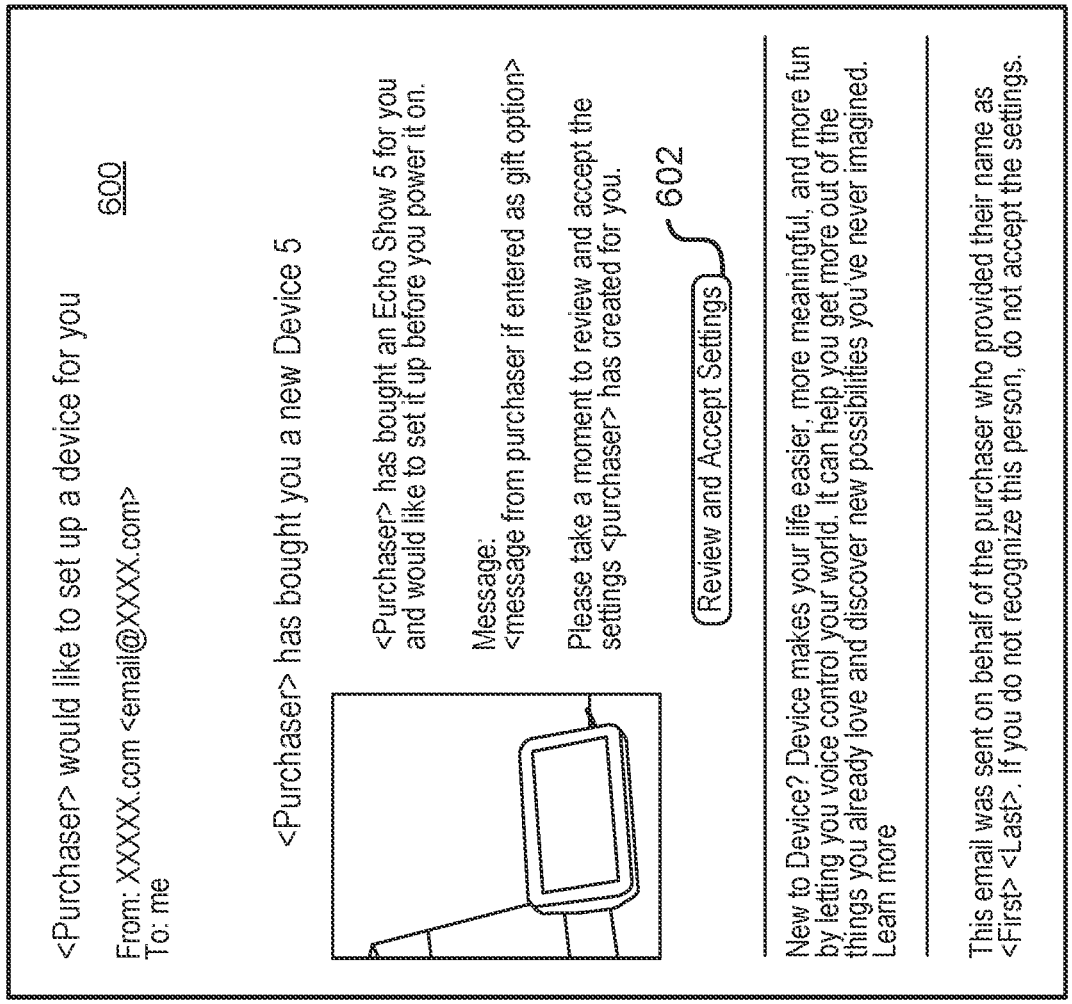
FIG. 6 illustrates an example confirmation message for a user accepting the specifying of network information and configuration settings specified by another user and implementing a configuration feature, according to at least one embodiment.

FIG. 6 illustrates an example confirmation message 600 for a user accepting the specifying of network information and configuration settings specified by another user and implementing a configuration feature, according to at least one embodiment. As described herein, the configuration features of the current disclosure include providing configuration information on behalf of another user such that a user device can be automatically or semi-automatically configured to work upon being received by the another user. To ensure security and provide sufficient clarity to the recipient of the user device that implements the configuration features described herein, the computer system and service may require that the recipient be informed of the gift and participate (opt-in) to their information being shared to the service for pre-configuring the user device. As illustrated in FIG. 6, the confirmation message 600 provides information which identifies the recipient, the gift provider, a type of user device, and options 602 to enable the recipient to accept the terms of the configuration features (e.g., opt-in to the process).

Figure 7:
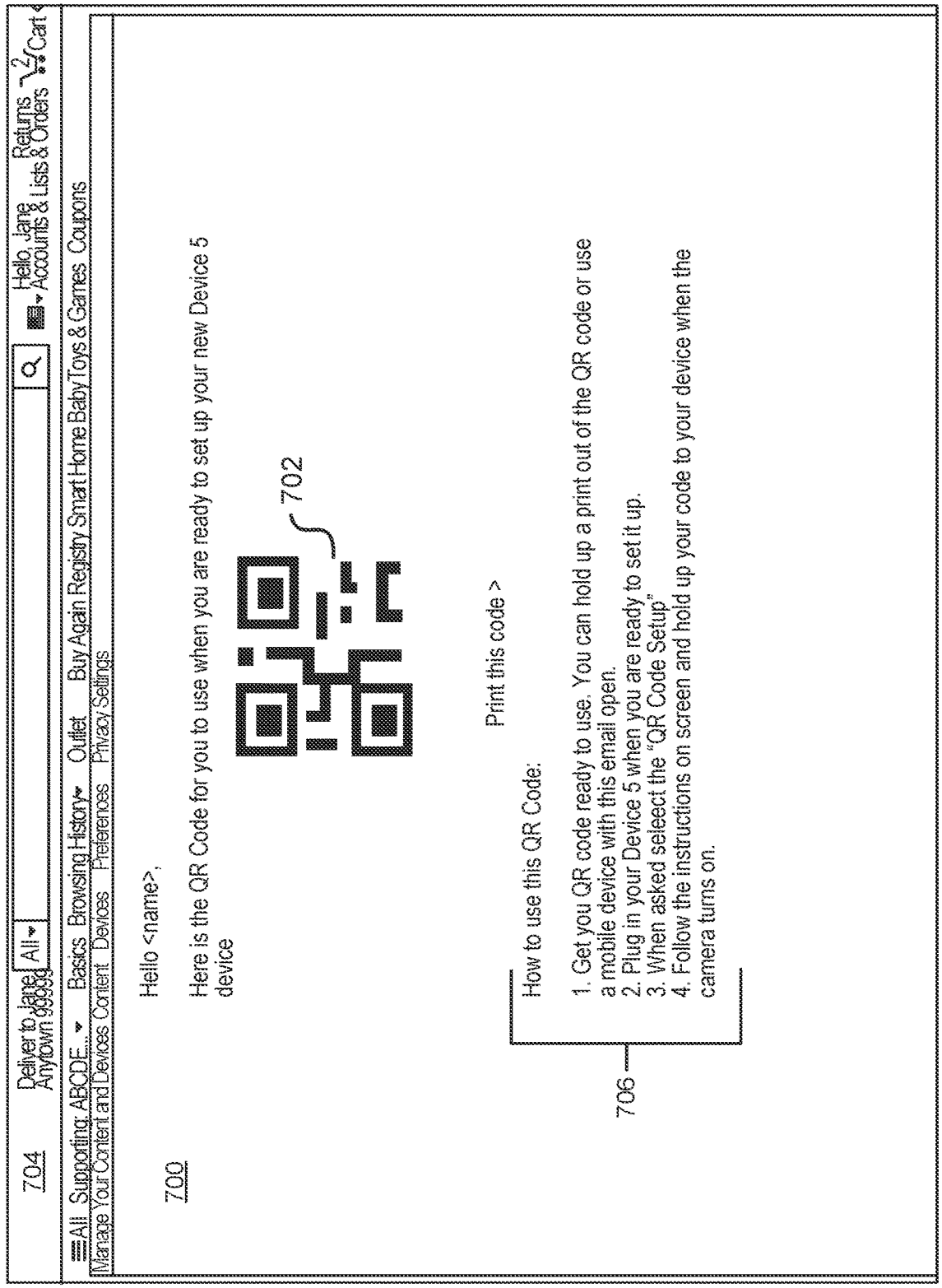
FIG. 7 illustrates an example user interface for presenting a machine-readable code which includes information for configuring a user device in a configuration feature, according to at least one embodiment.

FIG. 7 illustrates an example user interface 700 for presenting a machine-readable code 702 which includes information for configuring a user device and implementing a configuration feature, according to at least one embodiment. The user interface 700 is presented via an application 704 though the user interface 700 can be presented via other platforms such as web page. In embodiments, the user interface 700 presents the machine-readable code 702, here in FIG. 7 as a QR code, for presentation to a user device. The user device may interact with the machine-readable code 702 to receive the network information and/or a token that includes the account information for a user. User interface 700 also includes information 706 on how to utilize the machine-readable code 702 to configure the received user device.

Figure 8:
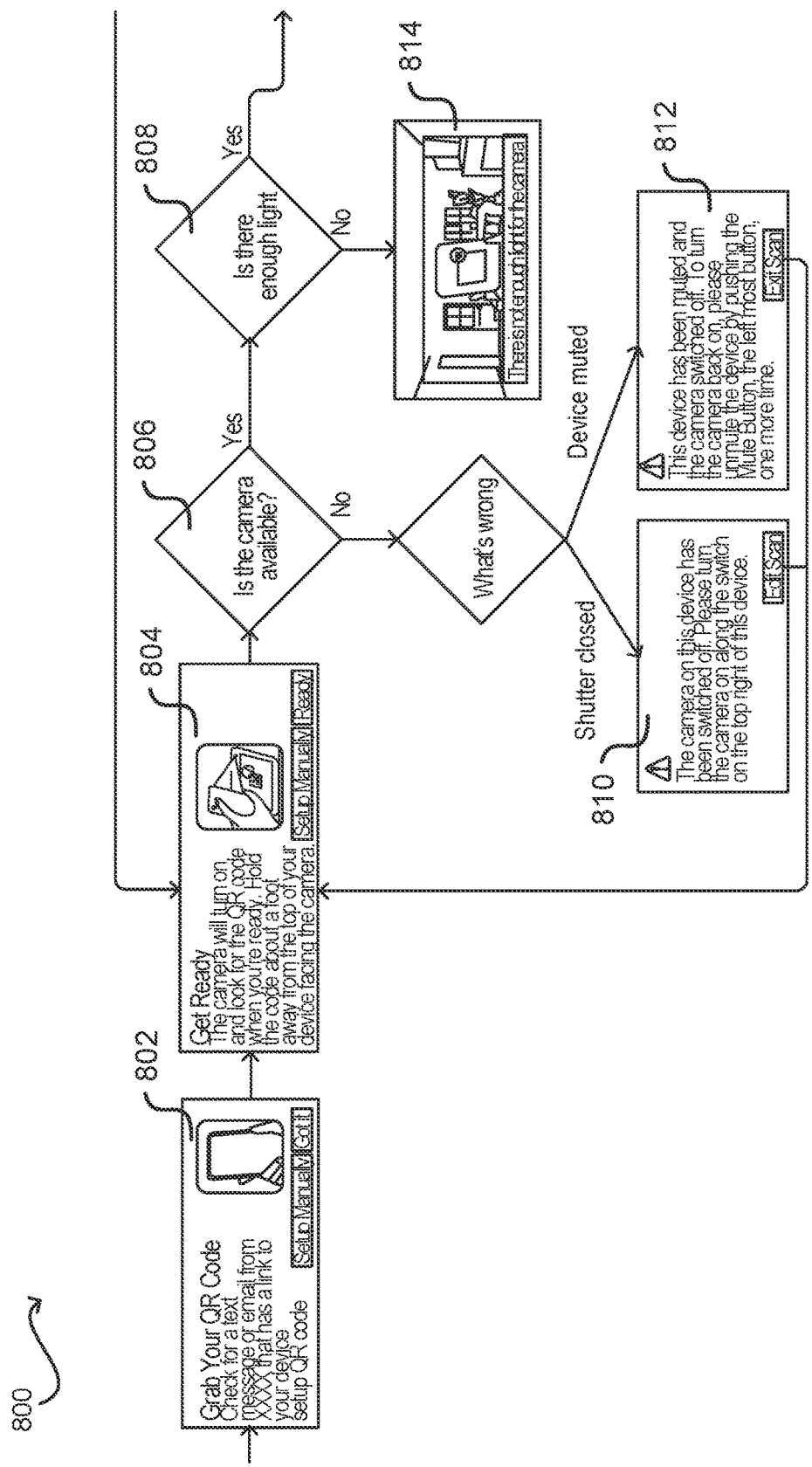
FIG. 8 illustrates an example workflow for interacting with a provided machine-readable code for configuring a user device and implementing a configuration feature, according to at least one embodiment.

FIG. 8 illustrates an example workflow 800 for interacting with a provided machine-readable code for configuring a user device and implementing a configuration feature, according to at least one embodiment. The workflow 800 includes options for a user utilizing a provided machine-readable code, a QR code in this example, to configure the user device as well as trouble shooting steps in case the QR code is not properly interacted with by the user device. For example, at 802 the workflow identifies that a user should check their text messages for the QR code. At 804, the workflow indicates that a user should present the QR code to the camera of the user device. 804 also includes options for a user to manually configure the user device. The workflow 800 includes several decision paths such as a step 806 which asks whether the camera of the user device is available, and 808 which asks if there is enough ambient light in the current room which the user is attempting to setup the user device.

In situations where the camera is unavailable (806), the workflow presents a number of reasons 810 and 812 as to why the camera is not interacting with the QR code. Similarly, if there is not enough light in the room 808, the workflow 800 might inform the user, based on using sensors or input from the assistant configuration device, that there is not enough light in the room 814. The computer system may send instructions or guidance to a user (not pictured) aiding the user in ensuring that there is enough light in the room for the camera of the user device to capture the QR code presented via the assistant configuration device.

Figure 9:
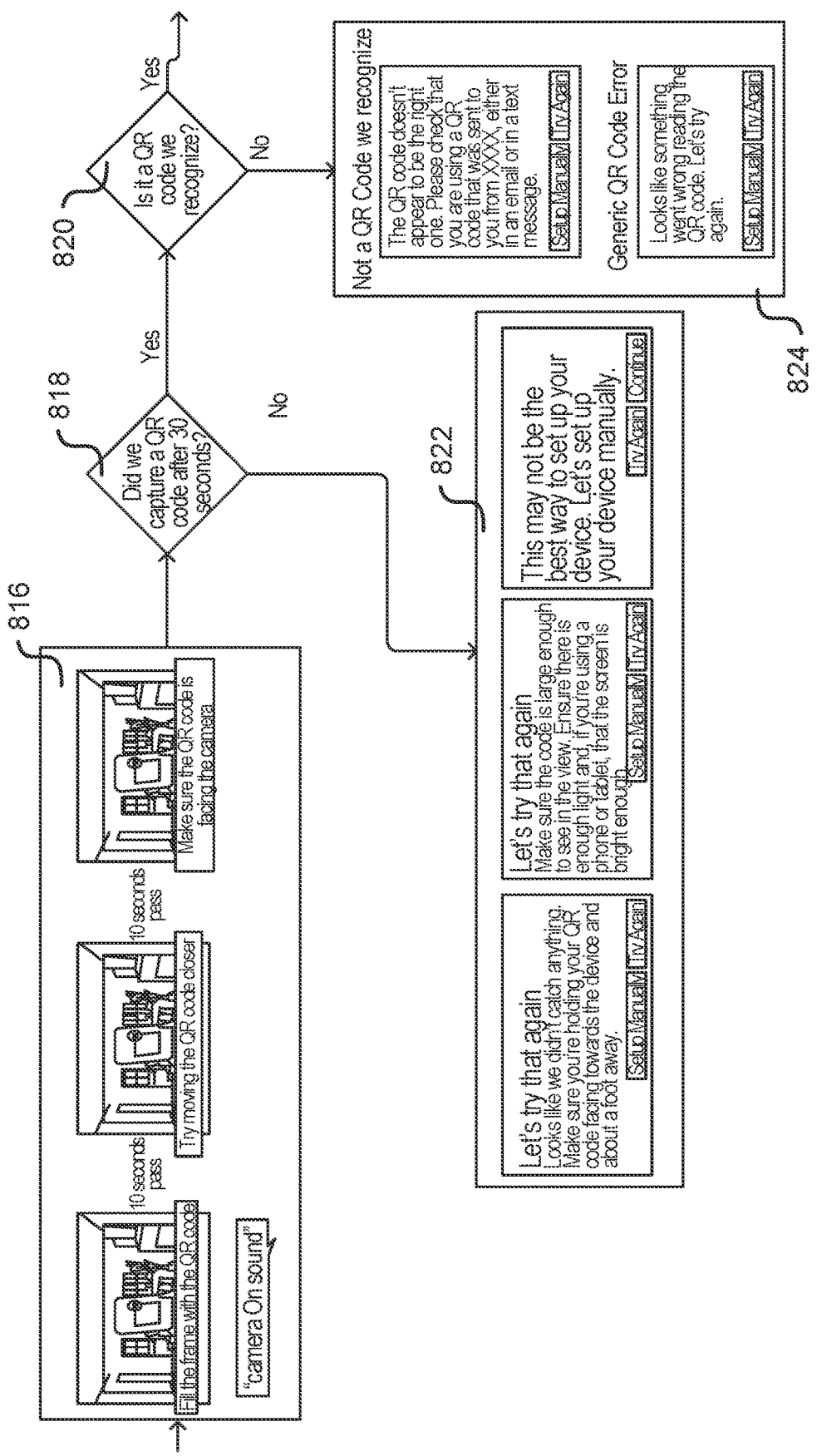
FIG. 9 illustrates an example workflow for interacting with a provided machine-readable code for configuring a user device and implementing a configuration feature, according to at least one embodiment.

FIG. 9 illustrates an example workflow 800 for interacting with a provided machine-readable code for configuring a user device and implementing a configuration feature, according to at least one embodiment. FIG. 9 is a continuation of the workflow 800 for providing options and instructions for a user to interact with a machine-readable code to configure their user device. For example, workflow 800 of FIG. 9 at 816 includes several instructions for ensuring that the user is interacting with the QR code correctly with the user device. For example, the user may be instructed to place the QR code such that it fills the entire frame of the camera of the user device, moving the QR code closer to the camera of the user device, or to make sure that the QR code is facing the camera of the user device.

At 818, the workflow asks whether the QR code was captured after a certain period of time, such as 30 seconds. If so, the workflow 800 determines whether the QR code is one that is recognized by the computer system 820. If so, the user device should proceed to decrypt the QR code or information of the QR code and begin connecting to a network and configuring itself.

However, if the QR code is not captured in the certain time period (818), the workflow includes several more instructions to the user for capturing the QR code at 822 including an option to manually set up the user device. The workflow 800 includes options at 824 if the QR code is not recognized by the user device. For example, the user may have ordered several different user devices, even different types of user devices, and received multiple QR codes each of which is associated with a different user device. In such situations the user may be instructed to try another QR code which is meant for a specific user device they are currently interacting with in order to configure that particular user device. In other situations the workflow 800 may instruct the user to make sure they are using the correct QR code sent via a particular communication channel and from a particular service or to proceed to manually setup the user device. In embodiments, a single QR code may include information for multiple user devices. In such cases each user device that is being configured will determine and read the corresponding information for configuring itself based on the information it can decrypt or the tokens it can decrypt included in the QR code.

Figure 10A:
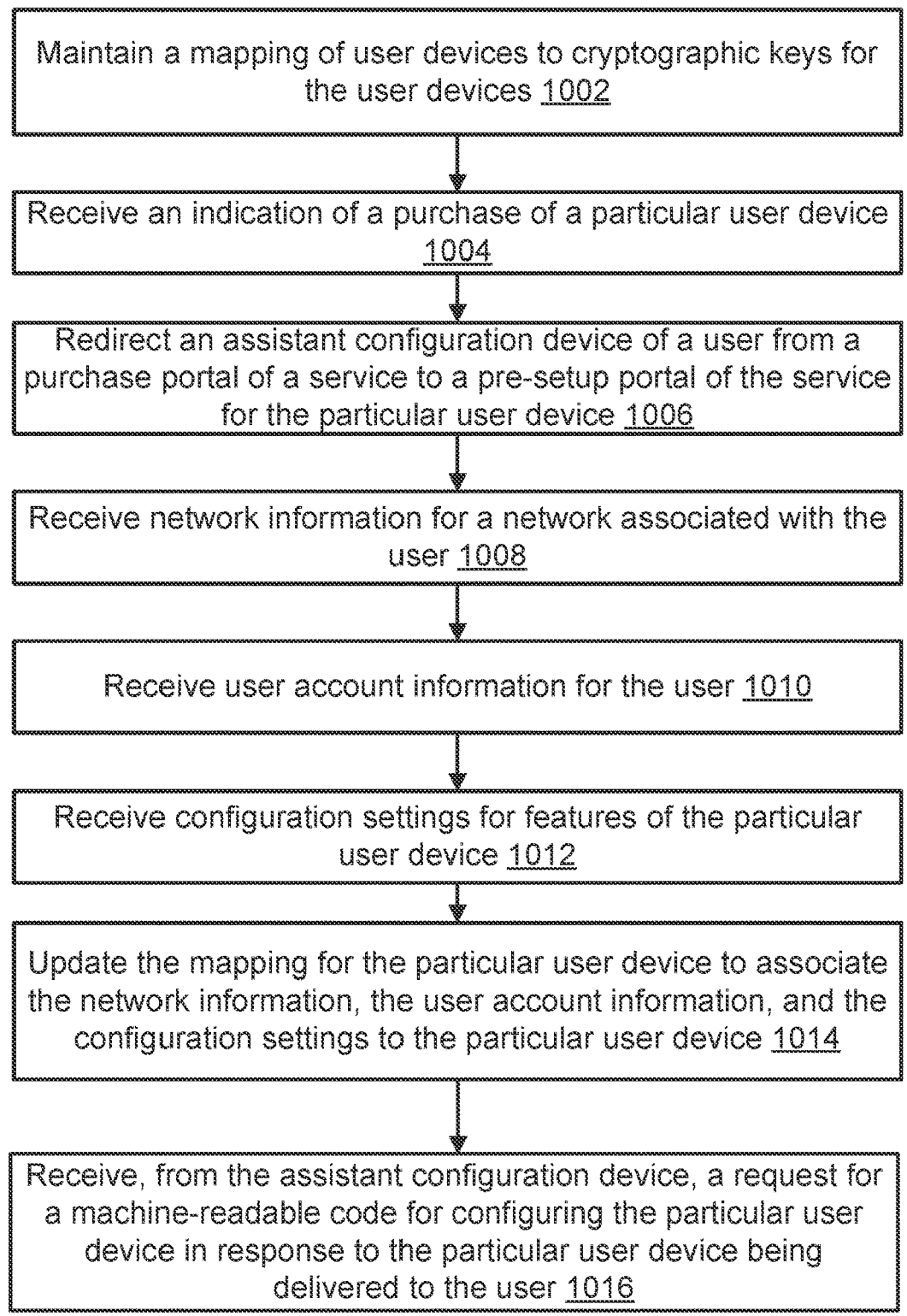
FIG. 10A illustrates an example of a flow diagram for providing a configuration feature, according to at least one embodiment.
Figure 10B:
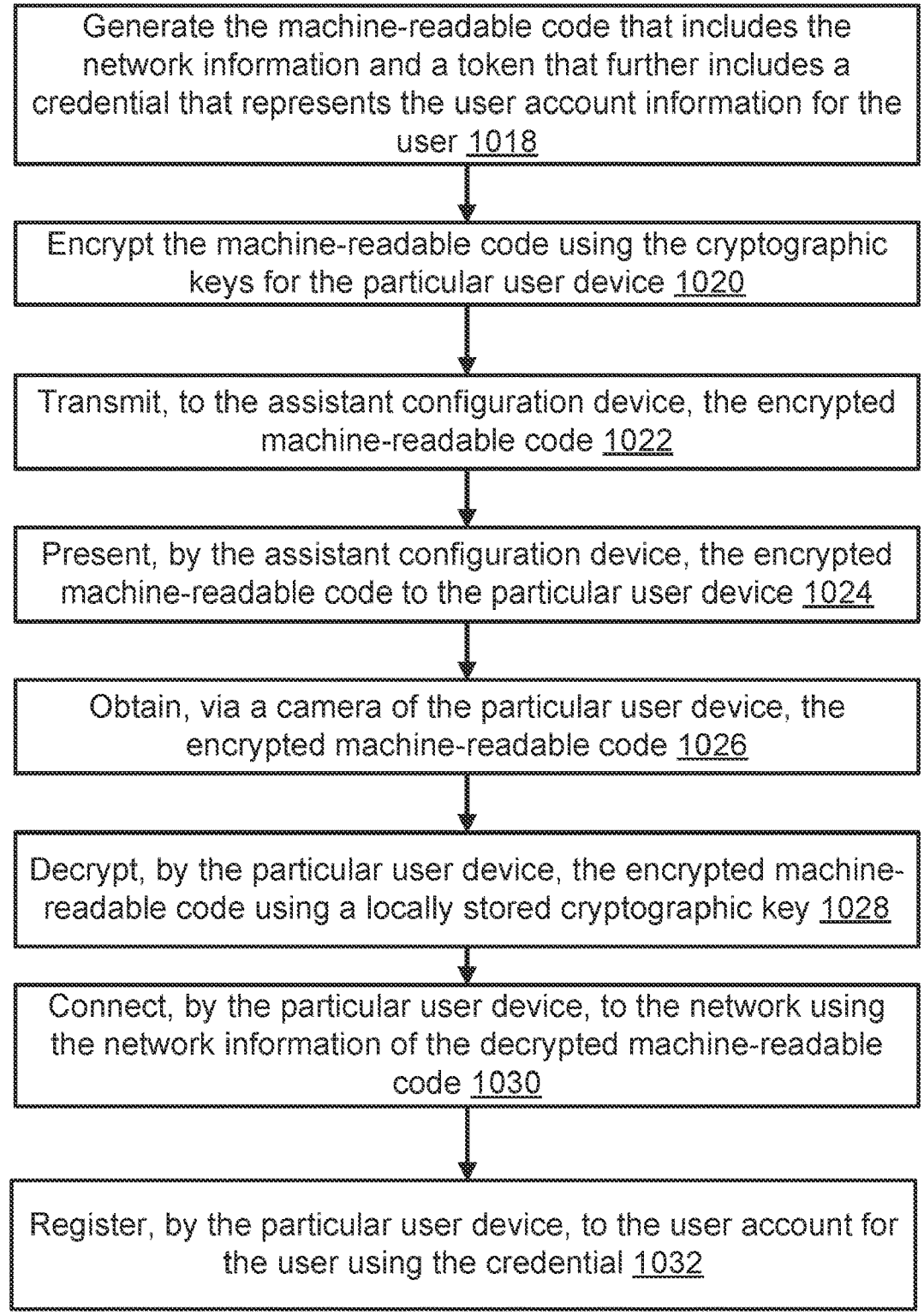
FIG. 10B illustrates an example of a flow diagram for providing a configuration feature, according to at least one embodiment.

FIGS. 10A and 10B illustrate an example of a flow diagram for providing a configuration feature, according to at least one embodiment. In an example, the flow starts at 1002, where a computer system maintains a mapping of user devices to cryptographic keys for the user devices. In embodiments, each cryptographic key of the cryptographic keys may be encrypted, by the computer system, using device specific information for each user device of the user devices. For example, the device specific information may include a device identifier or some other secret information that is associated with each user device.

At operation 1004, the computer system receives, from an assistant configuration device, an indication of a purchase of particular user device of the user devices. For example, the computer system may host or otherwise be associated with an online merchant that offers goods and services such as the user devices.

At operation 1006, the computer system redirects the assistant configuration device of a user from a purchase portal of a service to a pre-setup portal of the service for the particular user device. In embodiments, the service may be hosted or otherwise supported by the computer system. The user may specify that the purchase of the particular user device is for themselves or for another user. In cases where the purchase is on behalf of another user, the user that is purchasing the particular user device can provide network information and configuration settings on behalf of the other user. In such cases the computer system may generate and transmit a confirmation message to the another user who must opt-in to the configuration features described herein before the computer system generates machine-readable codes or updates a mapping of user devices to users.

At operation 1008, the computer system receives network information for a network associated with the user. In embodiments, the network information may be provided via the pre-setup portal and include a network ID (e.g., a service set identifier (SSID)) for a network and password for the network.

At operation 1010, the computer system receives user account information for the user via the pre-setup portal. The user account information may include a user identifier and password for the service that implements the configuration features or is otherwise associated with the computer system.

At operation 1012, the computer system receives configuration settings for features of the particular user device via the pre-setup portal. In embodiments the configuration settings can include accessibility settings for the particular user device as well as other settings for applications which are integrated into the particular user device. In accordance with at least one embodiment, the configuration settings can include an identification of certain applications which the user wishes to be pre-installed onto the particular user device. The pre-setup portal may be configured to present options for specifying the configuration settings based on a type of the particular user device that the user is purchasing for themselves or for another user.

At operation 1014, the computer system updates the mapping for the particular user device to associate the network information, the user account information, and the configuration settings to the particular user device. For example, the computer system may update a table or database that maintains information for each user device including the cryptographic keys and updates the entry for the particular user device to associate the network information and configuration settings for the particular user device.

At operation 1016, the computer system receives, from the assistant configuration device, a request for a machine-readable code for configuring the particular user device in response to the particular user device being delivered to the user. In embodiments, the machine-readable code may be a quick response (QR) code, a barcode, or it may be in the form of a near field communication (NFC) tag or Bluetooth device that is provided to the user and includes the network information and user account information.

At operation 1018, the computer system generates the machine-readable code that includes the network information and a token that further includes a credential that represents the user account information for the user. In embodiments, the token may be a time limited token that expires upon expiration of a certain time period. In embodiments, the user purchasing the particular user device or the service associated with the configuration features may specify the certain time period (e.g., 1 day, 15 days, 30 days, etc.). In accordance with at least one embodiment, a user, such as the user purchasing the particular user device or the user receiving the particular user device that someone else purchased on their behalf, can request a new QR code which includes a newly generated token upon expiration of the time period associated with the token.

At operation 1020, the computer system encrypts the machine-readable code using the cryptographic keys for the particular user device. In embodiments, the computer system may encrypt the machine-readable code and/or the token.

At operation 1022, the computer system transmits the encrypted machine-readable code to the assistant configuration device. In embodiments, the encrypted machine-readable code may be transmitted as a short message service (SMS) text message, via email, or as an application notification to the assistant configuration device.

At operation 1024, the assistant configuration device presents the encrypted machine-readable code to the particular user device. In embodiments, the assistant configuration device may present the encrypted machine-readable code to the individual computer device via an associated user interface of the assistant configuration device.

At operation 1026, the particular user device may obtain, using an associated camera, the encrypted machine-readable code. For example, the camera or image sensor of the particular user device may capture an image, scan, or otherwise interact with the machine-readable code presented by the assistant configuration device.

At operation 1028, the particular user device decrypts the encrypted machine-readable code using a locally stored cryptographic key. In embodiments, the locally stored cryptographic key corresponds to or is otherwise associated with the cryptographic keys for the particular user device maintained by the computer system.

At operation 1030, the particular user device connects to the network using the network information of the decrypted machine-readable code. For example, the particular user device may extract the network information included in the decrypted machine-readable code and automatically connect to a local network using the extracted network information.

At operation 1032, the particular user device registers the particular user device to the user account for the user using the credential. For example, the particular user device may communicate with the computer system to provide the credential to the computer system and service which associates the particular user device to the user associated with the user account information. The computer system and/or associated service may verify the user account information and support the registering of the particular user device to the user associated with the user account information.

Figure 11:
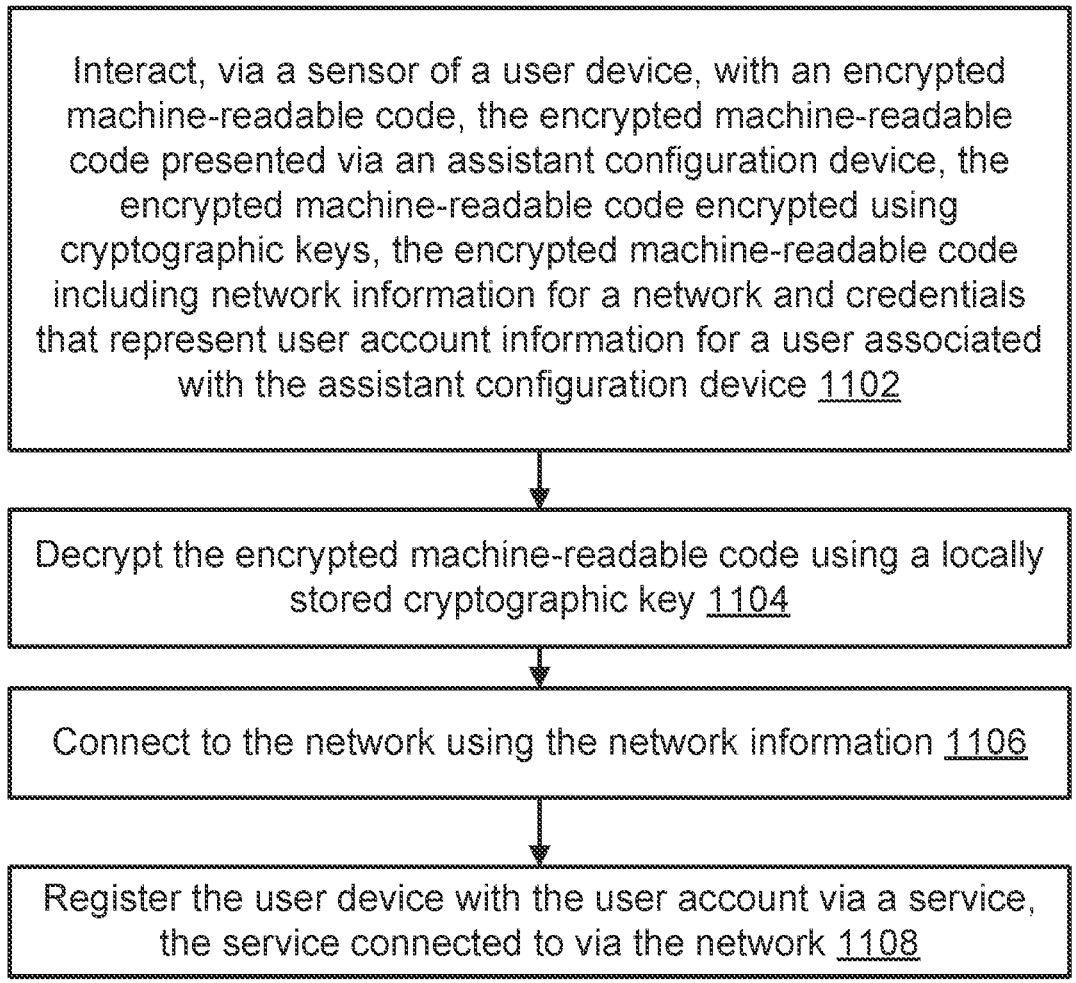
FIG. 11 illustrates an example of a flow diagram for providing a configuration feature, according to at least one embodiment.

FIG. 11 illustrates an example of a flow diagram for providing a configuration feature, according to at least one embodiment. In an example, the flow starts at 1102, where a user device interacts, via a camera of the user device, with an encrypted machine-readable code. In accordance with at least one embodiment, the encrypted machine-readable code is encrypted using cryptographic keys. The encrypted machine-readable code may include network information for a network and credentials that represent user account information for a user associated with the assistant configuration device.

At operation 1104, the user device decrypts the encrypted machine-readable code using a locally stored cryptographic key.

At operation 1106, the user device connects to the network using the network information.

At operation 1108, the user device registers the user device with the user account via a service, where the service is connected to via the network. In accordance with at least one embodiment, the locally stored cryptographic key is stored in secure hardware component of the user device. As described herein, the user device may connect to the network (local network within proximity range) by detecting a presence of another user device (a provisioning device) that is already connected to the same network. In embodiments, the provisioning device may be configured to communicate with the user device, transmit the network information and user account information to the user device, and support the user device connecting to the same network and registering the user device with the user account associated with the user.

Figure 12:
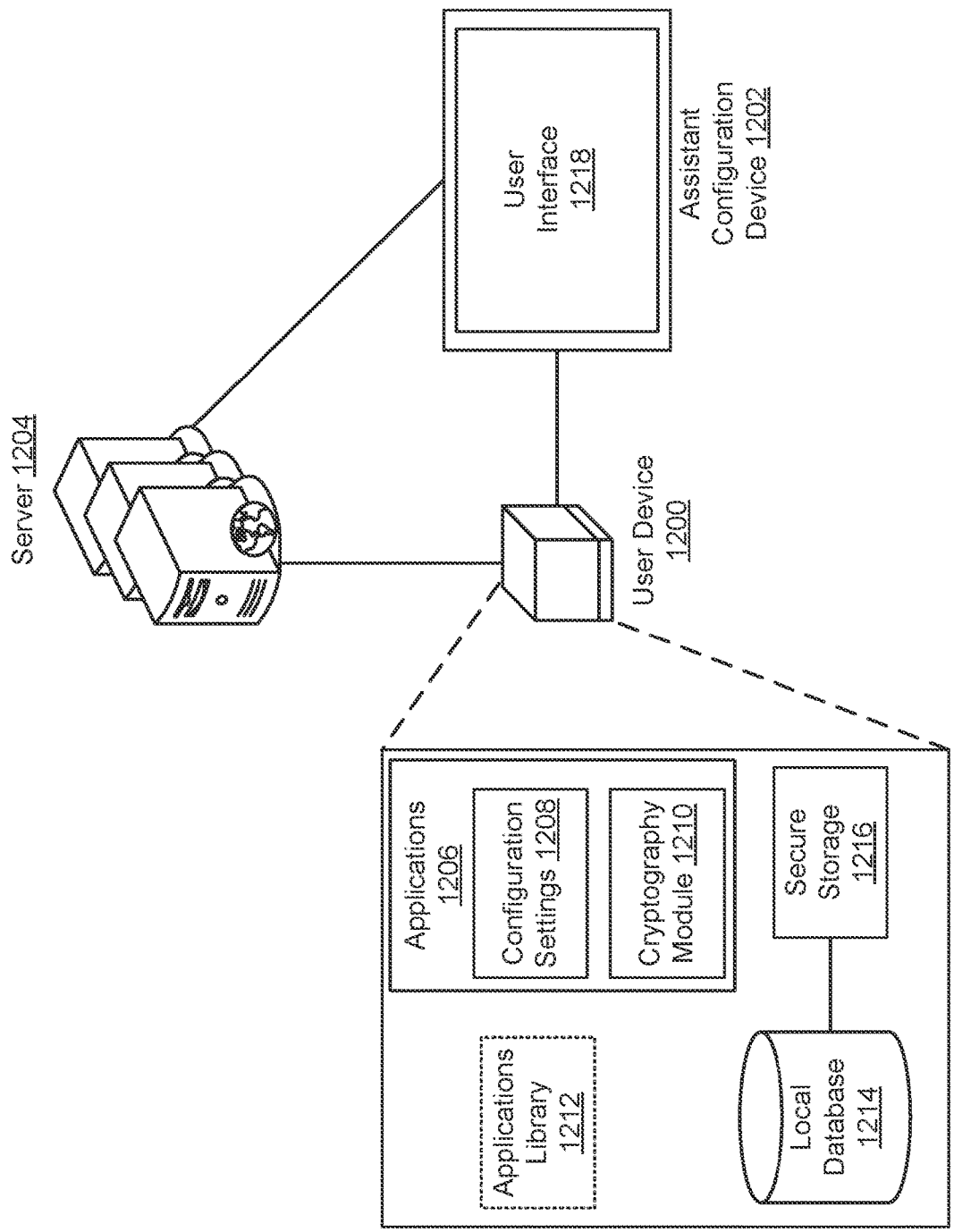
FIG. 12 illustrates an example of a system that includes a user device, a assistant configuration device, and a server set to support configuration feature for automatically configuring the computer device, according to at least one embodiment.

FIG. 12 illustrates an example of a system that includes a user device 1200, an assistant configuration device 1202, and a server (computer system) 1204 to support configuration features for automatically connecting the user device 1200 to a network and registering the user device 1200 to a user account upon interacting with a machine-readable code presented via assistant configuration device 1202, according to at least one embodiment. The user device 1200 can be communicatively coupled with the server 1204 upon connecting to a local network (network—not pictured) using network information of the machine-readable code presented via the assistant configuration device 1202. In particular, the user device 1200 can include applications 1206 which implements one or more applications for adjusting configuration settings 1208 as well as decrypting and processing machine-readable codes and tokens included in the machine-readable codes presented by assistant configuration device 1202 via cryptography module 1210. The user device 1200 can include an applications library 1212 for obtaining or implementing one or more application programming interface (API) calls for applications 1206 of the user device 1200 or other applications stored on user device 1200, or applications or programs from server 1204 once the user device 1200 is connected to the network. In FIG. 12, the applications library 1212 is illustrated with a dotted line to indicate that the user device 1200 may request data for other applications of the user device 1200 from other sources such as server 1204, from nearby devices (provisioning devices—not pictured) or directly from third party computers (not pictured) via an available network. The user device 1200 may include a local database 1214 and secure storage 1216. The local database 1214 and secure storage 1216 may be used to store information for a user (user account information) associated with user device 1200 or a cryptographic key for decrypting encrypted payloads obtained or otherwise transmitted to user device 1200. Configuration settings for the user device 1200 may be stored in local database 1214. In embodiments, the server 1204 can be a cloud computing platform.

In addition, the server 1204 can include one or more applications, modules, or programs for implementing configuration features described herein. For example, the server 1204 may include applications 1206, configuration settings 1208, cryptography module 1210, applications library 1212 to provide similar functionalities. In accordance with at least one embodiment, the server 1204 may be configured to maintain, via one or more database or storage caches, a mapping of user devices to cryptographic keys, user account information, and configuration settings. For example, a device identifier for a user device may be mapped to a specific cryptographic key, user account information for a specific user, network settings for a network associated with the same user, and configuration settings provided by the same user or on behalf of the user. In embodiments, the server 1204 may be in communication with one or more servers or computer systems such as servers associated with a facility (fulfillment center) that stores user devices and ships the user devices upon receiving orders for said user devices. The server 1204 may receive indications of purchase of a particular user device along with a device identifier for the user device which can result in updating the mapping of users to user devices maintained by the server 1204. The server 1204 may be configured to generate and transmit, to user devices such as assistant configuration device 1202, user interfaces, web pages, application user interfaces, etc. The user interfaces that are presented via assistant configuration device 1202 may include purchase portals which enable users to purchase user devices as well as pre-setup portals which enable users to provide network information, user account information, and configuration settings for a user device.

The server 1204 may be configured to receive the network information, user account information, configuration settings, and update the mapping of user devices and cryptographic keys to further associate the received information to the user devices and user. The server 1204 may include an application or module for generating machine-readable codes which include the network information as well as an encrypted information, such as a token with credentials that represent the user account information, or encrypting the machine-readable codes themselves. The server 1204 may include cryptography module 1210 for maintaining cryptographic keys which may be unique to each user device and for encrypting payloads such as network information and tokens which further include credentials that represent user account information in a machine-readable code or encrypting the machine-readable code itself. In embodiments, the server 1204 may be in communication with assistant configuration device 1202 and may transmit the encrypted machine-readable codes or payloads of information to the assistant configuration device 1202. The assistant configuration device 1202 may be configured to present, via user interface 1218, the machine-readable code. In embodiments, the user device 1200 may include one or more cameras or sensors (not pictured) for obtaining images, scanning, or otherwise interacting with the machine-readable codes presented by user interface 1218 of assistant configuration device 1202 or otherwise transmitted by assistant configuration device 1202 to user device 1200.

Figure 13:
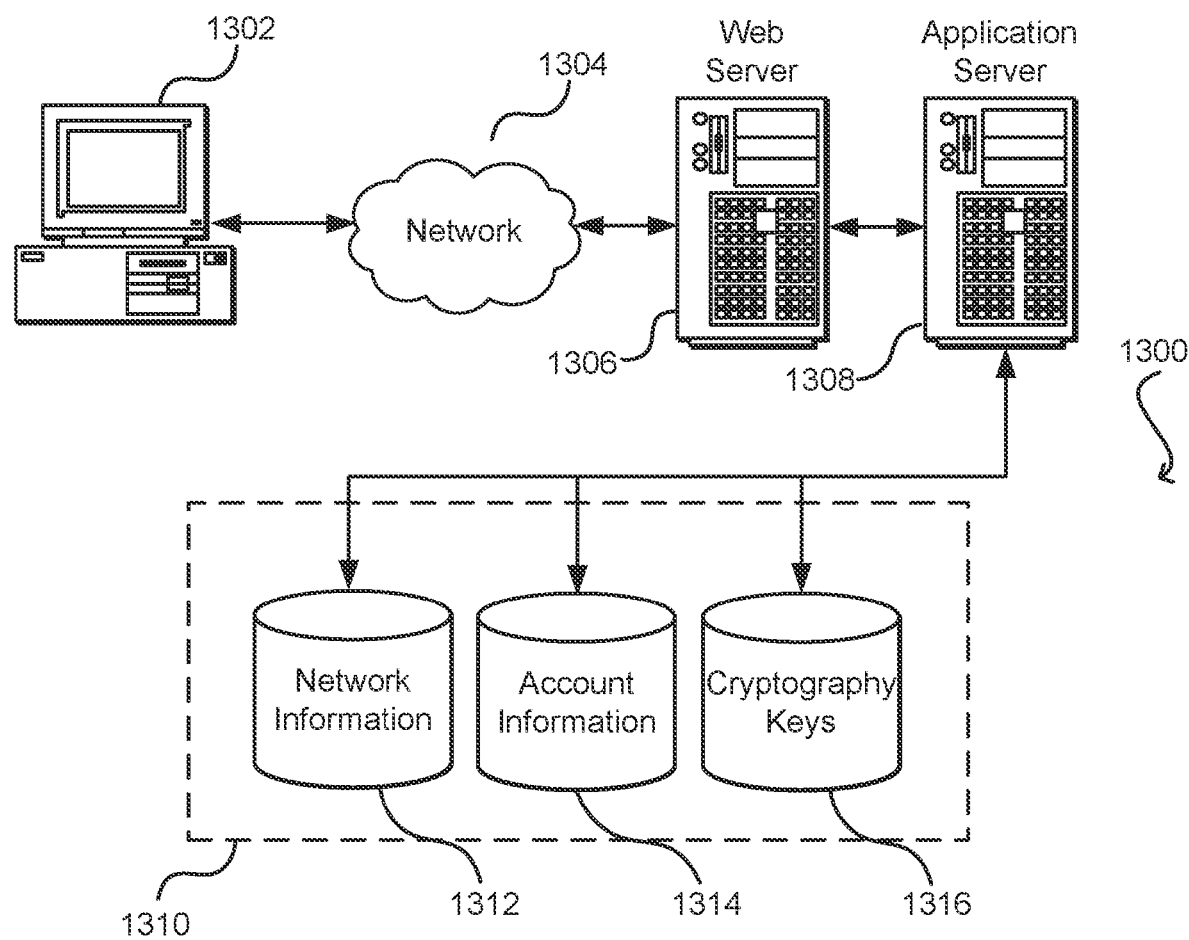
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 1302. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 1306 or other servers over the network 1304 or other networks.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing network information 1312 and cryptographic keys 1316, which can be used to serve content for the production side as well as generate a machine-readable code which can include an encrypted payload for configuring a user device upon scanning or otherwise interacting with the QR code as described herein. The data store also is shown to include a mechanism for storing account information 1314, which can be used for reporting, analysis, or other such purposes such as registering (associating) a user device with a user as well as mapping configuration settings for the user device to the user account for use in configuring a user device as described herein. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as JavaR, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
maintaining, by a computer system, a mapping of user devices to cryptographic keys for the user devices, the mapping associating a locally stored cryptographic key of each user device with at least one of the cryptographic keys;
receiving, by the computer system and from an assistant configuration device, an indication of a purchase of a particular user device of the user devices;
redirecting, by the computer system, the assistant configuration device of a user from a purchase portal of a service to a pre-setup portal of the service for the particular user device in response to the indication;
receiving, by the computer system and via the pre-setup portal, network information for a network associated with the user;
receiving, by the computer system and from the pre-setup portal, user account information for the user;
receiving, by the computer system and from the pre-setup portal, configuration settings for features of the particular user device;
updating, by the computer system, the mapping for the particular user device to further associate the network information, the user account information, and the configuration settings to the particular user device having the locally stored cryptographic key;
receiving, by the computer system and from the assistant configuration device, a request for a machine-readable code for configuring the particular user device in response to the particular user device being delivered to the user;
generating, by the computer system, the machine-readable code that includes the network information and a token that further includes a credential that represents the user account information for the user;
encrypting, by the computer system, the machine-readable code using the at least one of the cryptographic keys associated with the locally stored cryptographic key for the particular user device according to the mapping;
transmitting, by the computer system and to the assistant configuration device, the encrypted machine-readable code;
presenting, by the assistant configuration device, the encrypted machine-readable code to the particular user device;
obtaining, by the particular user device using a camera of the particular user device, the encrypted machine-readable code;
decrypting, by the particular user device, the encrypted machine-readable code using the locally stored cryptographic key;
connecting, by the particular user device, to the network using the network information of the decrypted machine-readable code; and
registering, by the particular user device, the particular user device to the user account for the user using the credential.

2. The computer-implemented method of claim 1, further comprising:
connecting, by the particular user device, to the computer system via the network;
receiving, by the particular user device, the configuration settings based at least in part on the mapping; and
adjusting, by the particular user device, the configuration settings for the particular user device using the configuration settings.

3. The computer-implemented method of claim 1, wherein the machine-readable code includes a quick response (QR) code, a barcode, a near field communication (NFC) tag, or a Bluetooth device.

4. The computer-implemented method of claim 1, wherein the pre-setup portal presents options for the configuration settings based at least in part on a type of the particular user device.

5. A computer-implemented method, comprising:
maintaining, by a computer system, a mapping of user devices to cryptographic keys for the user devices, the mapping associating a locally stored cryptographic key of each user device with at least one of the cryptographic keys;
receiving, by the computer system and from an assistant configuration device, a first indication of a purchase of a particular user device of the user devices;
redirecting, by the computer system, the assistant configuration device of a user from a purchase portal of a service to a pre-setup portal of the service for the particular user device in response to the first indication;
receiving, by the computer system and via the pre-setup portal, network information for a network associated with the user;
receiving, by the computer system and from the pre-setup portal, user account information for the user;
updating, by the computer system, the mapping for the particular user device to further associate the network information and the user account information to the particular user device having the locally stored cryptographic key;
receiving, by the computer system, a second indication that the particular user device is delivered to the user;
generating, by the computer system, machine-readable code that includes the network information and a token that further includes a credential that represents the user account information for the user in response to receiving the second indication;
encrypting, by the computer system, the machine-readable code using the at least one of the cryptographic keys associated with the locally stored cryptographic key for the particular user device according to the mapping; and
transmitting, by the computer system and to the assistant configuration device, the encrypted machine-readable code, the assistant configuration device configured to present the encrypted machine-readable code to the particular user device, the particular user device configured to decrypt the encrypted machine-readable code using the locally stored cryptographic key, connect to the network, and register the particular user device to the user account for the user using the network information and the credential.

6. The computer-implemented method of claim 5, further comprising receiving, by the computer system and from the pre-setup portal, configuration settings for features of the particular user device.

7. The computer-implemented method of claim 6, further comprising updating, by the computer system, the mapping for the particular user device to associate the configuration settings to the particular user device in response to receiving the configuration settings from the pre-setup portal.

8. The computer-implemented method of claim 5, wherein the token is a time limited token that expires upon expiration of a certain time period.

9. The computer-implemented method of claim 8, further comprising:
   determining, by the computer system, that the certain time period has expired;
   generating, by the computer system, a new machine-readable code that includes a new token that further includes the credential that represents the user account information for the user; and
   transmitting, by the computer system, the new machine-readable code to the assistant configuration device.

10. The computer-implemented method of claim 5, wherein the network information and the configuration settings are specified by the user on behalf of another user.

11. The computer-implemented method of claim 10, further comprising generating, by the computer system, a confirmation message upon receiving a third indication that the network information and the configuration settings are on behalf of the another user, the confirmation message configured to enable the another user to opt-in to the user providing the network information and the configuration settings for the particular user device.

12. The computer-implemented method of claim 11, further comprising:
   transmitting, by the computer system, the confirmation message to another assistant configuration device associated with the another user; and
   receiving, by the computer system and from the another assistant configuration device, acceptance of the opt-in to the user providing the network information and the configuration settings for the particular user device, wherein updating the mapping for the particular user device is based at least in part on receiving the acceptance.

13. The computer-implemented method of claim 5, further comprising receiving, by the computer system and from the pre-setup portal, input for specifying one or more applications to pre-load on the particular user device.

14. A user device comprising:
   a memory configured to store computer-executable instructions; and
   a processor in communication with the memory configured to execute the computer-executable instructions to at least:
      interact, via a sensor of the user device, with an encrypted machine-readable code, the encrypted machine-readable code presented via an assistant configuration device, the encrypted machine-readable code encrypted using cryptographic keys associated with a locally stored cryptographic key at the user device according to a mapping, the encrypted machine-readable code including network information for a network and credentials that represent user account information for a user associated with the assistant configuration device;
      decrypt the encrypted machine-readable code using the locally stored cryptographic key;
      connect to the network using the network information; and
      register the user device with the user account via a service, the service connected to via the network.

15. The user device of claim 14, wherein the processor in communication with the memory is further configured to execute the computer-executable instructions to at least receive, via the service and the network, configuration settings for features of the user device, the configuration settings specified by the user.

16. The user device of claim 15, wherein the processor in communication with the memory is further configured to execute the computer-executable instructions to at least modify the configuration settings for the features of the user device in response to receiving the configuration settings via the service.

17. The user device of claim 14, wherein the locally stored cryptographic key is stored in a secure hardware component of the user device.

18. The user device of claim 14, wherein the processor in communication with the memory is further configured to execute the computer-executable instructions to at least identify a presence of a provisioning device within a detection range of the user device.

19. The user device of claim 18, wherein the processor in communication with the memory is further configured to execute the computer-executable instructions to at least:
   connect to the provisioning device; and
   receive, by the user device and from the provisioning device, the network information for the network and the credentials.

20. The user device of claim 14, wherein the sensor is a microphone and the encrypted machine-readable code is an audio signal.

* * * * *